United States Patent [19]

Mrdjen

[11] 4,012,776
[45] Mar. 15, 1977

[54] LUMINESCENT SCREEN LASER SCANNING TECHNIQUE

[75] Inventor: Peter Mrdjen, Menlo Park, Calif.

[73] Assignee: Xerox Corporation, Stamford, Conn.

[22] Filed: Feb. 2, 1976

[21] Appl. No.: 654,313

Related U.S. Application Data

[63] Continuation-in-part of Ser. No. 589,106, June 23, 1975, abandoned.

[52] U.S. Cl. .................................. 358/75; 355/4; 358/63; 358/288
[51] Int. Cl.² ..................... H04N 9/10; H04N 9/14
[58] Field of Search ............... 178/7.6; 358/75, 80, 358/41, 53, 63; 355/4

[56] References Cited

UNITED STATES PATENTS

| | | | |
|---|---|---|---|
| 2,422,778 | 6/1947 | Finch | 358/75 |
| 3,842,195 | 10/1974 | Takahashi et al. | 358/75 |

OTHER PUBLICATIONS

Advertisement — p. 144, Electronics Design, Nov. 8, 1973, No. 23.
IBM Technical Disclosure Bulletin, vol. 16, No. 9, Feb. 1974.

*Primary Examiner*—Robert L. Richardson
*Attorney, Agent, or Firm*—M. J. Colitz; F. C. Weiss; L. Zalman

[57] ABSTRACT

A laser scanning system for scanning an original color document with light of three different colors. In a first operative sequence, the output beam from a laser, which comprises light of a first color, is incident upon a rotating scanning member, the light therefrom being directed to a reflecting first portion of a luminescent screen, the light reflected from said first screen portion completely scanning the entire original document. In a second operative sequence, the laser light from said rotating scanning member is directed to a second portion of said luminescent screen having a material associated therewith which produces light of a second color in response to the incident laser light, the light produced by said second portion of said luminescent screen scanning the entire original document. In a third operative sequence, the laser light from said rotating scanning member is directed to a third portion of the luminescent screen having a material associated therewith which produces light of a third color in response to the incident laser light, the light produced by said third portion of said luminescent screen scanning the entire original document.

The light reflected from the original document corresponding to the informational content thereof is detected and an electrical signal generated in response thereto, the electrical signal being utilized locally or transmitted to a remote modulated scanner to produce a color copy of the original document.

In an alternate embodiment, the light produced by each screen portion is caused to scan, in sequence, an elemental area of the original document.

42 Claims, 7 Drawing Figures

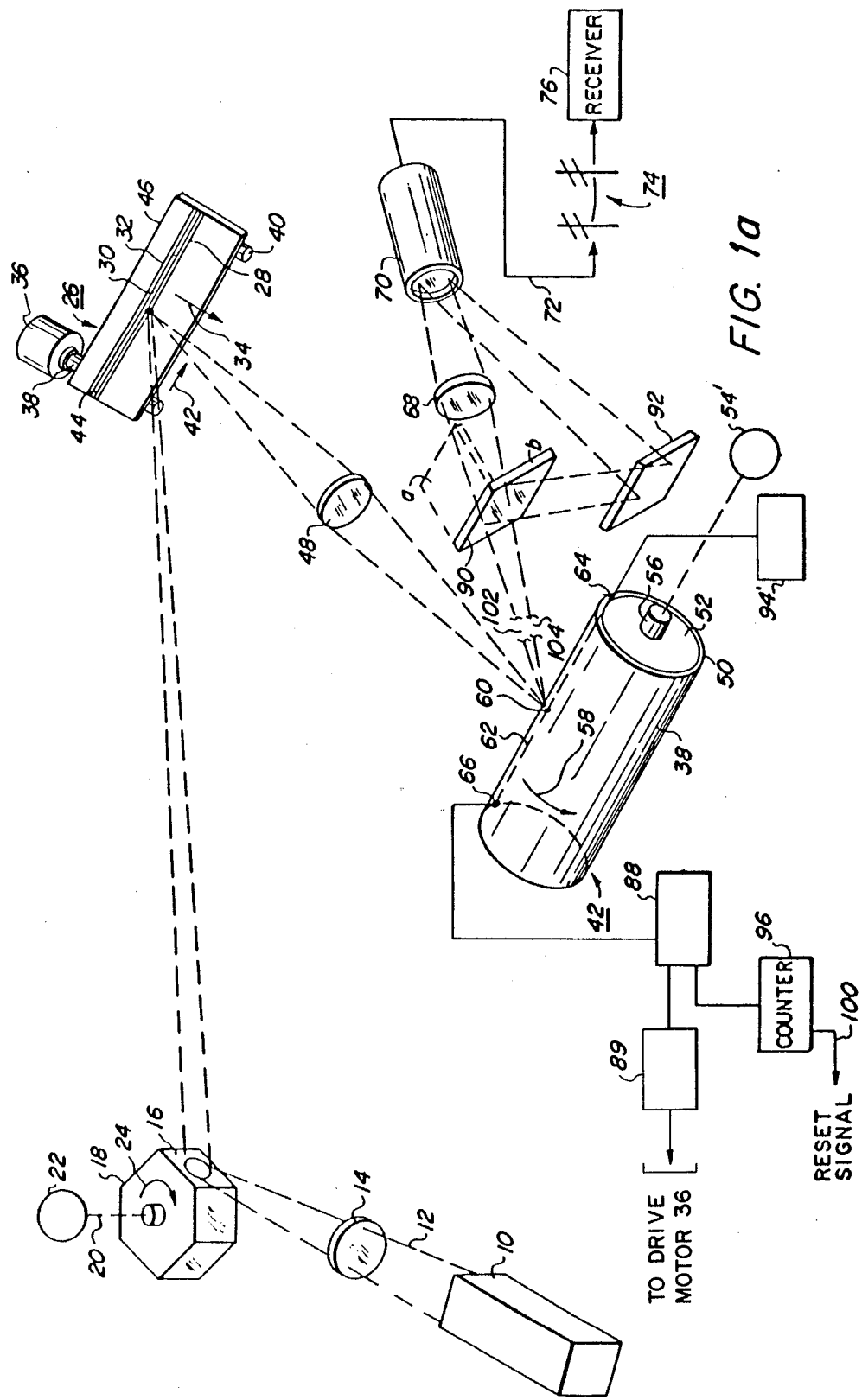

LUMINESCENT SCREEN LASER SCANNING TECHNIQUE

RELATED APPLICATIONS

This application is a continuation-in-part of application Ser. No. 589,106, filed June 23, 1975 and now abandoned.

BACKGROUND OF THE INVENTION

In prior art laser scanning systems, a laser beam is reflected from a rotating polygonal or multifaceted mirror to scan an object, such as an original document. The informational content of the document, in the form of light and dark transmissions, is detected by a photosensor, the photosensor generating corresponding electrical signals. The electrical signals may be transmitted to a remote receiver for modulating a laser beam thereat, the modulated laser beam being directed to a recording media, such as unexposed film or a photosensitive medium whereby an output copy of the original document may be printed. Alternately, the light and dark transmissions from the scanned original document may be printed. Alternately, the light and dark transmissions from the scanned original document may be utilized directly to produce a copy of the original on a local basis.

Presently, most prior art laser scanning systems have been limited to producing black and white copies of the scanned original. For example, the non-impact printer disclosed in U.S. Pat. No. 3,864,697 utilizes a helium-neon gas laser as the source of scanning radiation, the output beam thereof having a wavelength of approximately 633 angstroms, corresponding to the red portion of the visible spectrum. The charged photosensitive medium utilized is sensitive to the output beam of the helium-neon laser, the beam selectively discharging the medium to form an electrostatic latent image corresponding to the information to be provided or copied.

U.S. Pat. No. 3,622,690 discloses an electronic color scanner which provides color corrected separation negatives or positives and which utilizes two lasers for emitting radiation having wavelengths corresponding to the blue, green and red region of the visible spectrum. The first laser comprises an argon laser which is capable of emitting blue and green light simultaneously therefrom, the second laser comprising the aforementioned helium-neon gas laser (red light).

An obvious disadvantage in adapting the laser scanning system disclosed in the latter named patent for use as a color copier or printer is the relatively large cost of the argon laser and the additional complexities inherent in a system which utilizes more than one laser for scanning purposes. In this regard, an article by Fuji et al. in the IEEE Journal of Quantum Electronics, March 1975, page 111, discloses the use of a single hollow-cathode type CW laser as a source of white light consisting of red, green and blue spectral lines. However, the suggested "white" laser is, at this time, not commercially available and its use in color scanning apparatus has yet to be demonstrated.

Therefore, a need exists for a simplified and economical laser scanning system which utilizes commercially available lasers and which is capable of producing radiation of the aforementioned three color spectral lines for use in a color copier or printer.

SUMMARY OF THE PRESENT INVENTION

The present invention provides a technique for scanning a color original document with light of three colors and producing a color copy of the original locally or at a remote location.

In a first operative sequence, the output beam from a laser, which comprises light of a first color, is incident upon a rotating scanning member, the light therefrom being directed to a reflecting first portion of a luminescent screen, the light reflected from said first screen portion, in the preferred embodiment, completely scanning the entire original document. In a second operative sequence, the laser light from said rotating scanning member is directed to a second portion of said luminescent screen having a material associated therewith which produces light of a second color in response to the incident laser light, the light produced by said second portion of said luminescent screen completely scanning the entire original document. In a third operative sequence, the laser light from said rotating scanning member is directed to a third portion of the luminescent screen having a material associated therewith which produces light of a third color in response to the incident laser light, the light produced by said third portion of said luminescent screen completely scanning the entire original document.

The light reflected from said elemental area of said original document corresponding to the informational content thereof is detected and an electrical signal generated in response thereto, the electrical signal being utilized locally or transmitted to a remote modulated scanner to produce a color copy of the original document.

In an alternate embodiment, the light from each screen portion is caused to scan, in sequence, an elemental area of the original document.

It is an object of the present invention to provide method and apparatus for generating light of three colors utilizing a single monochromatic laser beam.

It is a further object of the present invention to provide method and apparatus for generating light of two colors by irradiating a luminescent screen with laser light of a third color, portions of the screen comprising material which emits light of predetermined colors in response to radiation incident thereon.

It is still an object of the present invention to provide method and apparatus for generating light of two colors by utilizing a single laser which emits light of a third color, the light of each color completely scanning the entire original document in sequence.

It is an object of the present invention to provide a laser scanning raster type device utilizing a single laser for completely scanning a color original document, in sequence, with light of three colors, the light reflected from said scanned document being utilized locally or transmitted to a remote location to produce a color copy of the original document. ,

DESCRIPTION OF THE DRAWING

For a better understanding of the invention, as well as other objects and further features thereof, reference is made to the following description which is to be read in conjunction with the accompanying drawing wherein:

FIGS. 1 and 1a illustrate alternate embodiments of the scanning system of the present invention;

FIG. 4a and 4b illustrate the induced emission spectra of the naphtalamide and rhodamine type dyes which may be utilized in the system of FIGS. 1, 1a, 3 and 3a.

DESCRIPTION OF THE PREFERRED EMBODIMENTS

Figure 1:
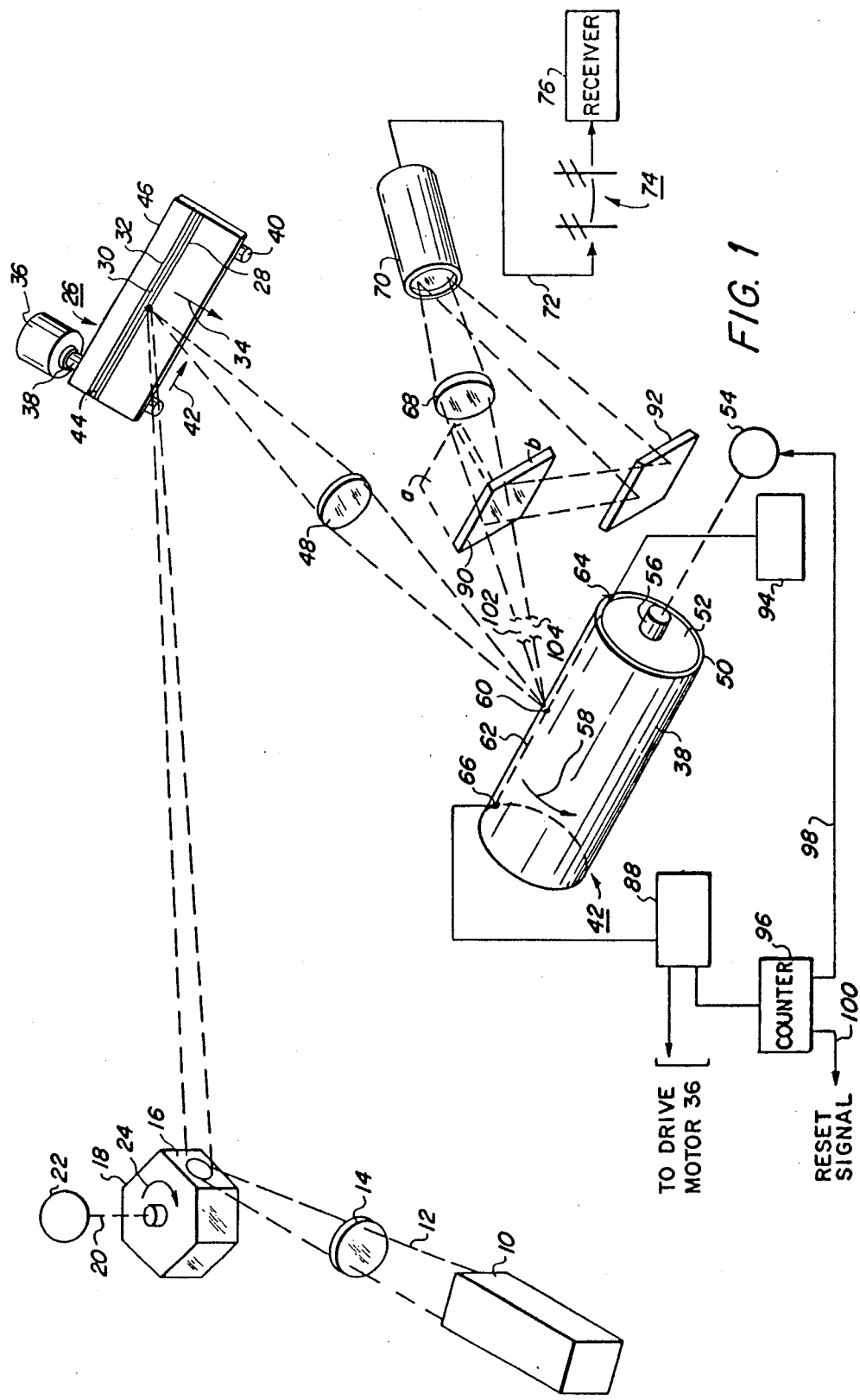

FIG. 1 illustrates a color scanner embodying the principles of the present invention. In particular, light beam 12 from laser 10 is utilized as the scanning light beam and is focused by lens 14 onto one face, or facet, 16 of multifaceted rotating mirror 18. Although mirror 18 is illustrated as comprising six facets, any number of facets may be utilized, the criteria therefor depending in part on scanning resolution, cost, etc. It should be noted, for example, that a galvanometer or solid state scanner could be utilized in place of rotating mirror 18. Mirror 18 is mounted on drive shaft 20 which is driven by motor 22, mirror 18 being rotated in the direction of arrow 24. The laser light beam 12 is focused by a lens system, represented by lens 14 and directed to mirror facet 16 as shown. The laser light beam is reflected by facet 16 to a luminescent screen 26 which has successive strip portions 28, 30 and 32 formed thereon. As will be explained in more detail hereinafter, two of strip portions 28, 30 and 32 comprise luminescent material which emits radiation of a predetermined wavelength when irradiated by laser beam 12. The third strip portion comprises material which is reflective of laser beam 12. Luminescent screen 26 is adapted to be incrementally advanced in the direction of arrow 34 by drive means 36, lead screw 38 and guide rod 40 in a well known manner. By techniques well known in the art, mirror 18 is arranged such that laser beam 12 scans luminescent screen 26 in the direction of arrow 42 (hereinafter referred to as the "x" direction) from end 44 to end 46 of luminescent screen 26 as each facet traverses the laser beam 12 on rotating mirror 18, the position of the laser beam shown in the FIG. illustrating the scanning of strip portion 28 as the laser beam is reflected from facet 16. As will be explained in more detail hereinafter, successive facets on mirror 18 will successively scan strip portions 30 and 32 as the luminescent screen 26 is incrementally advanced in the direction of arrow 34. The light emitted from strip portion 28 is focused by a lens system, represented by lens 48, onto a color original document 50 which is supported by rotating member 52, such as the drum illustrated. It should be noted that by advancing screen 26 in the direction of arrow 34 a constant distance between the strip portion being scanned and lens 48 is maintained. Drum 52 is adapted to be incrementally rotated by stepping motor 54 via drive shaft 56 in the direction of arrow 58. Preferably, drum 52 is continuously rotated by utilizing a continuous drive motor 54' in place of stepping motor 54, as described hereinafter with reference to FIG. 1a. The laser beam focused by lens 48 on document 50 forms a fine scanning spot 60 which traverses an elemental scan line 62 along document 50 from starting point 64 to end point 66, corresponding to the traversal of luminescent screen 26 by laser beam 12 from end 44 to end 46, respectively. It should be noted that the facet width of mirror 18, the length of luminescent screen 26 in the $x$ direction and the length of drum 52 are selected such that the traversal of laser beam 12 across luminescent screen 26 and scanning spot 60 across document 50 provides a full line scan of document 50.

The light reflected from the surface of document 50, the intensity of which is proportional to the informational content thereon, is transmitted through dichroic filter 68 and then to photodetector 70, which may be a photomultiplier tube. The output of photodetector 70 appearing on lead 72 is an electrical signal corresponding to the information detected on document 50 along scan line 62. Dichroic filter 68 is selected so that only light having spectra different from laser 10 and trimmed appropriately is transmitted to photodetector 70. In this manner, the light from laser 10 will not interfere with the light generated by two of the strip portions formed on luminescent screen 26.

The output of photosensor 70 is directed by lead 72 for transmission over communication lines 74 to a receiver 76 which can be a printer, copier, or the like.

Figure 2:
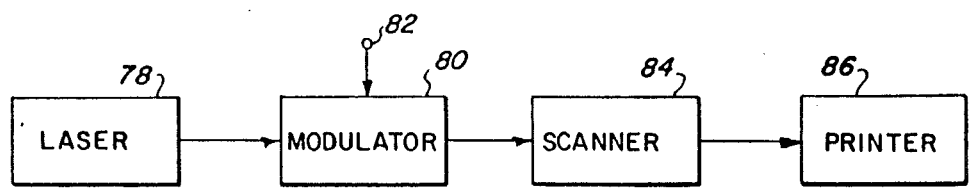
FIG. 2, when considered together with FIGS. 1 and 1a comprises a system for transmitting the informational content of an original color document to a receiver at a remote location for printing a copy of the original document.

A typical receiving system is represented in FIG. 2 as comprising a laser 78, a light modulator 80 driven by the incoming signal on line 82, a scanner 84 that moves in a synchronous manner with respect to the rotating scanner 18, drum 52 and the apparatus 36, 38 and 40 which incrementally moves luminescent screen 26 as shown in FIGS 1 and 1a and a printer 86 serving to produce output copy.

Modulator 80 may comprise commercially available acoustic-optic modulators and printer 86 comprises a scanning system similar to that described with reference to FIGS. 1 and 1a adapted to be utilized with a development apparatus capable of developing multicolor copies of an original color document. An apparatus which is capable of developing a color copy of a color original based on xerographic techniques is disclosed in U.S. Pat. No. 3,854,449, the teachings of which are incorporated herein by reference. By replacing the moving lamp assembly and lens system with a suitable scanning system, removing the platen and providing the proper control interface to enable the scanner and development apparatus to operate in timed relation with the cylical operation of the document scanner, the scanning (writing) light being controlled by the signal on line 32, a color copy of the original may be produced. For the embodiment shown in FIG. 1 (and 3), the scanning (writing) light is provided by a screen system similar to screen 26 or a white light source since three color light would be required to reproduce the original color document on a line to line basis whereas the scanning (writing) light is preferably produced by a single laser, such as a helium-neon or helium-cadmium laser in the continuous color document reproduction system shown in FIG. 1a (and 3a).

After scanning the spot traverses scan line 62, the remaining informational content on document 50 is similarly scanned (read) and transmitted via line 74 to receiver 76.

Since the present invention is directed to a system for scanning and reproducing color original documents, light of three different colors, such as red, green and blue, is required to scan (read) the document. Therefore, the strip portions 28, 30 and 32 are selected such that two of the strips will generate two of the colors when irradiated by laser beam 12 which is of the third color. The third strip is selected to reflect light beam 14 whereby the three color scanning light is provided and may comprise a white surface, a mirror or any other reflective material. In a typical embodiment, laser 10 is a helium-cadmium laser which generates blue laser light (4416A), strip portion 28 has a phosphor or dye embedded therein which generates green light when irradiated by light beam 14, strip portion 30 is fully reflective to light beam 14, directing the beam onto document 50, and strip portion 32 has a phosphor or dye embedded therein which generates red light when irradiated by light beam 14. It is noted that the strip portions may be arranged in any manner or sequence as long as three color light is projected in sequence onto document 50. Further, the dyes and phosphors utilized may be mixed together to provide many combinations of colors.

In operation, therefore, assuming a helium-cadmium laser is utilized as laser source 10, that strip portion 28 has a phosphor or dye which emits green light in response to the incident blue light, strip portion 30 is fully reflective to blue light, and strip portion 32 has a phosphor or dye embedded therein which emits red light in response to blue light incident thereon, after scan light 62 is scanned by the green light emitted by strip portion 28, drive motor 36 is energized to step luminescent screen 26 in the direction of arrow 34 to align laser light 12 on strip portion 30. Drive motor 36 is incremented by an end of scan line detector 88 which detects the position of scanning spot at the end of line 66. As the screen 26 is incremented, the light beam is repositioned to edge 44 of screen 26 and starting point 64 of scan line 62, document 50 being rescanned along scan line 62 by the blue light reflected by strip portion 30. At the end of the scan line, detector 88 increments drive motor 36 whereby screen 26 is positioned to align strip portion 32 with laser beam 12. At the same time screen 26 is incremented, the light beam has been repositioned to edge 44 of screen 26 and starting point 64 of scan line 62. As set forth hereinabove, strip portion 32 comprises a material which emits red light when irradiated by the light produced by laser 10. Therefore, document 50 is rescanned along scan line 62 by red light reflected by strip portion 32. In this manner, an elemental line on document 50 has been successively scanned by light of three different colors, the electrical signals corresponding thereto being transmitted to receiver 86 to reproduce a color scan line thereat. Since the light reflected from document 50 during the second scan is the light generated by laser 10, a mechanism is provided to deflect the light in a manner whereby dichroic filter 68 is not interposed in the optical transmission path. This may be accomplished by providing mirrors 90 and 92, shown in phantom, which directs the light in the path shown in phantom. Mirror 90, normally at position $a$, is moved to position $b$ when it is determined that the second scan is to be initiated. A mechanism, not shown, is activated by an electrical signal generated by start of line detector/counter 94 which generates a signal at the start of the second line scan, means (not shown) being provided to return mirrors 90 and 92 to their normal positions.

At the end of the third scan, counter 96, coupled to detector 88, acctivates motor 54 via lead 98 causing drum 52 to rotate an amount corresponding to the scan of a new line on document 50. At the same time, counter 96 generates a signal on lead 100 to reset drive motor 36 to its initial position whereby laser beam 12 is aligned with strip portion 28 whereby the succeeding line on document 50 can be scanned.

In the manner described hereinabove, the remaining elemental lines of document 50 are scanned by the three colors and the complete document is reproduced by printer 86.

In the preferred embodiment shown in FIG. 1a wherein reference elements having the same reference numerals as the elements shown in FIG. 1 are identical, drum 50 is continuously rotated by motor 54' in a manner whereby the complete document is scanned three times. In this case, the complete document is successively scanned by each of the colors provided by screen 26, in sequence, laser beam 12 repeatedly scanning one of the strip portions on screen 26 until the complete document is scanned. In this embodiment, motor 36 is caused to increment screen 26 so that a succeeding strip portion is scanned after the complete document is scanned. Counter means 89 increments screen 26 via motor 36 after each document pass in order that the next screen portion can be scanned by laser beam 12. After the third document pass, counter means 96 is provided to reset (reposition) screen 26 to its original (or initial) position.

In operation, therefore, assuming a helium-cadmium laser is utilized as laser source 10, that strip portion 28 has a phosphor or dye which emits green light in response to the incident blue light, that strip portion 30 reflects blue light and strip portion 32 has a phosphor or dye embedded therein which emits red light in response to blue light incident thereon, the plurality of scan lines 62 which comprise document 50 are scanned by the green light emitted by strip portion 28. Drive motor 36 is energized to step luminescent screen 26 in the direction of arrow 34 to align laser light 12 on strip portion 30 after counter 89 reaches a predetermined count corresponding to the number of scan lines on document 50, end of scan line detector 88 detecting the position of the scanning spot at the end of line 66. As the screen 26 is incremented, the light beam is repositioned to edge 44 of screen 26 and starting point 64 of an initial scan line 62, each of the scanlines comprising document 50 being scanned by the blue light reflected by strip portion 30 as drum 52 is continuously rotated. At the end of the complete document scan, counter 89 increments drive motor 36 whereby screen 26 is positioned to align strip portion 32 with laser beam 12. At the same time screen 26 is incremented, the light beam has been repositioned to edge 44 of screen 26 and starting point 64 of scan line 62. As set forth hereinabove, strip portion 32 comprises a material which generates red light in response to the blue light emitted by laser 10. Therefore, document 50 is completely scanned by red light reflected by strip portion 32. In this manner, document 50 has been successively scanned three times by light of three different colors, the electrical signals corresponding thereto being transmitted to receiver 86 to reproduce a color document thereat. As set forth hereinabove with reference to the FIG. 1 embodiment, since the light reflected from document 50 during the second scan is the light generated by laser 10, a mechanism is provided to deflect the light in a manner whereby dichroic filter 68 is not interposed in the optical transmission path. This may be accomplished by providing mirrors 90 and 92, shown in phantom, which directs the light in the path shown in phantom. Mirror 90, normally at position $a$, is moved to position $b$ when it is determined that the second scan is to be initiated. A mechanism, not shown, is activated by an electrical signal generated by counter 94' which generates a signal only at the start of the second complete scan of document 50, means (not shown) being provided to return mirrors 90 and 92 to their normal positions. Instead of using the mirror system described in FIGS. 1 and 1a, three dichroic mirrors, appropriately selected to transmit green, blue and red light, respectively, may be rotated in front of photosensor 70 in the appropriate sequence to provide the required color filtering.

At the end of the third complete scan of document 50, counter 96, coupled to detector 88, generates a signal on lead 100 to reset drive motor 36 to its initial position whereby laser beam 12 is aligned with strip portion 28 whereby a succeeding document can be scanned.

In the manner described hereinabove, the complete document 50 is scanned three times by the three colors and the complete document is reproduced by printer 86. The receiving system shown in FIG. 2 may be utilized with the scanning system shown in FIG. 1a to reproduce a color or black and white original as set forth hereinabove.

Figure 3:
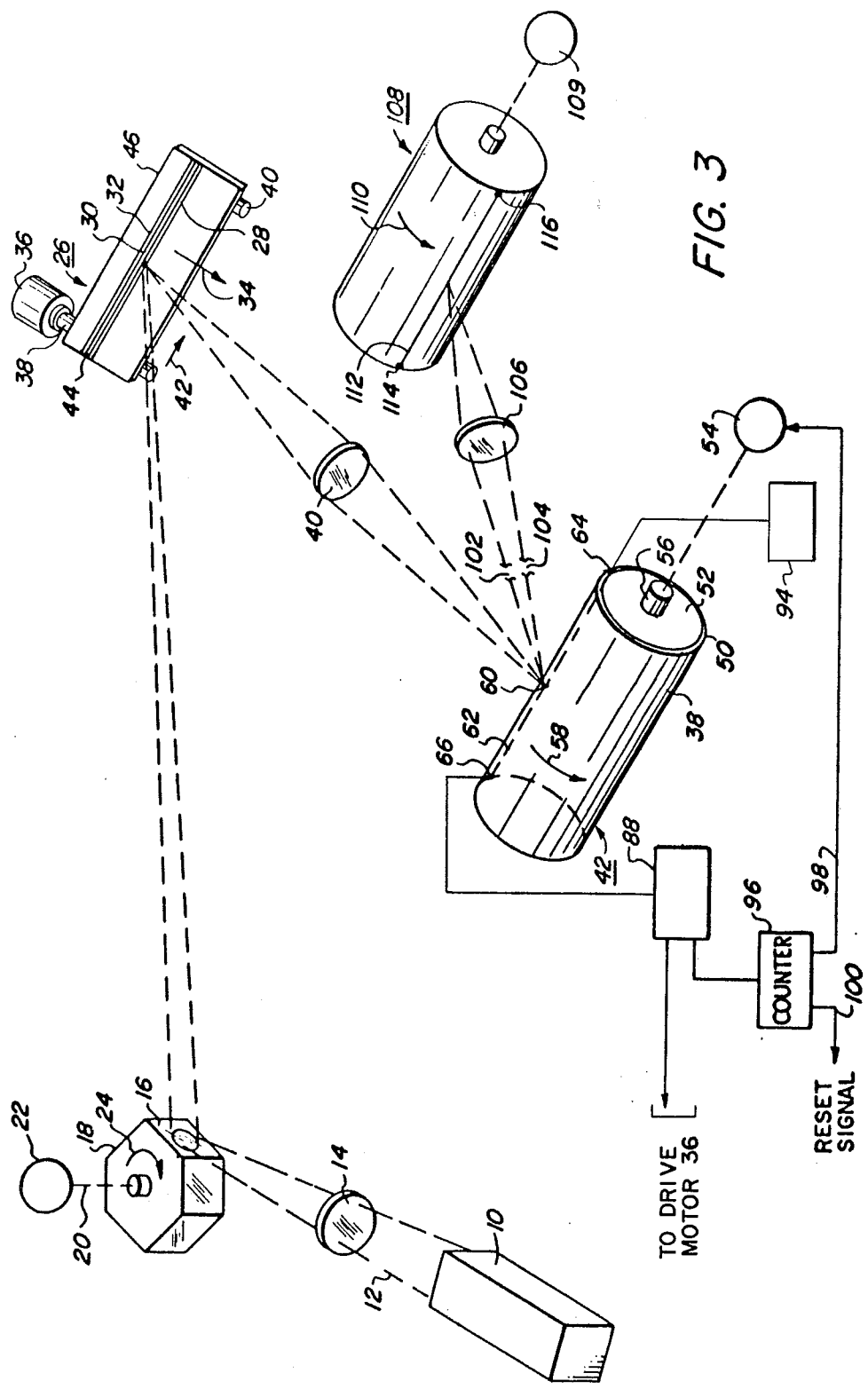
FIGS. 3 and 3a illustrate further embodiments of the scanning system of the present invention which are utilized to produce a copy of an original color document locally.
Figure 3A:
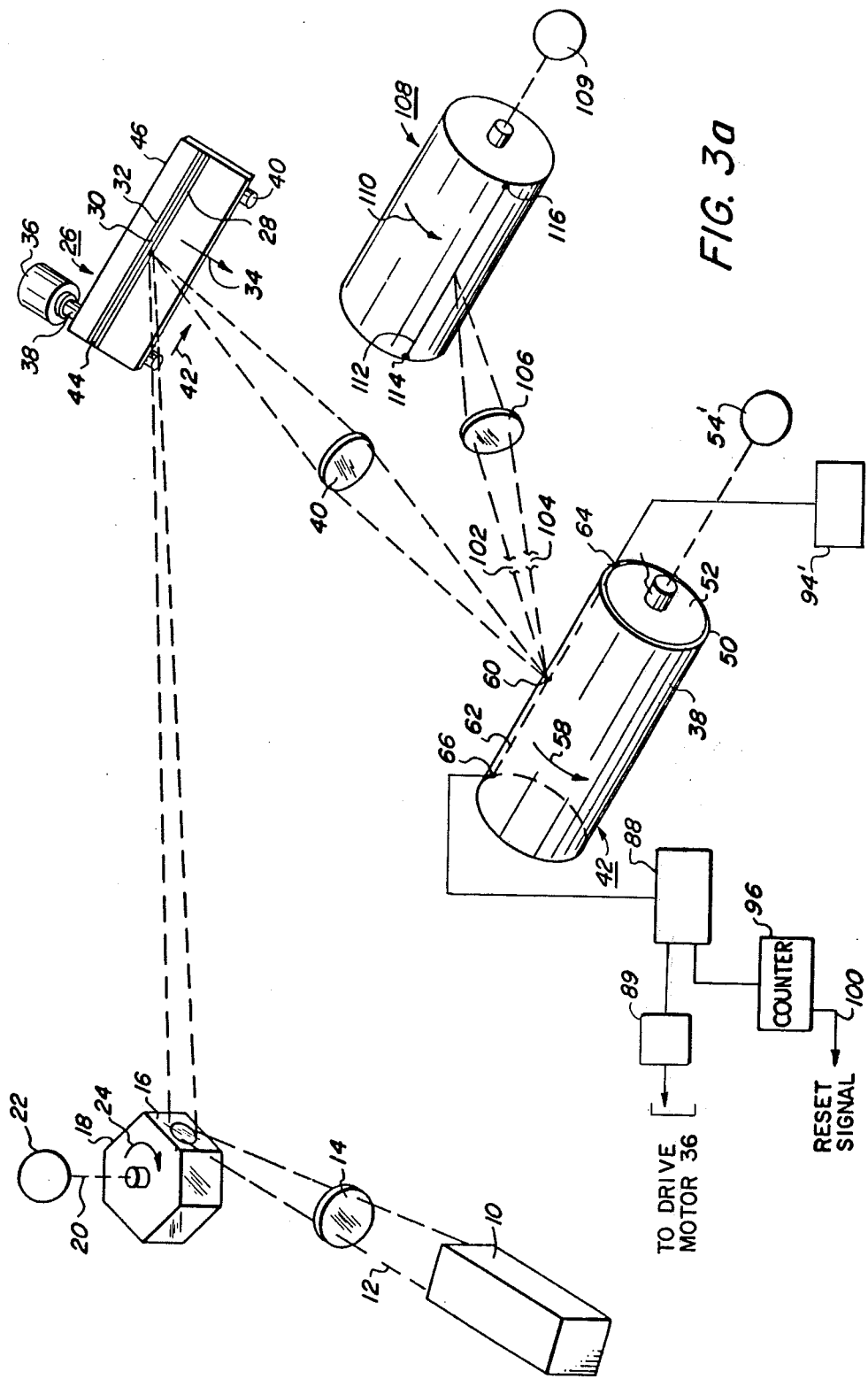

Alternative embodiments shown in a simplified, representational form are illustrated in FIGS. 3 and 3a where the structures shown are sustituted at points 102 and 104 in FIGS. 1 and 1a, respectively, in place of various elements, such as the photosensor 70, by substitution at points 102 and 104 respectively. It should be noted that dichroic filter 68, or the three dichroic mirror filter arrangement described hereinabove, although not shown in the figures for purposes of simplification, are part of the system described in FIGS. 3 and 3a. Information reflected from document 50 passes through lens 106 onto a photoconductive member 108 such as a drum having a photoconductive surface. Drum 108 moves as indicated by arrow 110, similar to the movement of drum 52 and information is traced on line 112 from point 114 to point 116 as the spot of light from luminescent screen 26 moves from point 64 to point 66 on document 50 in FIG. 1. As set forth hereinabove with reference to the embodiment shown in FIGS. 1 and 1a, the development apparatus shown in U.S. Pat. No. 3,854,449 may be easily adapted (i.e., photosensitive member 108 corresponds to member 10 shown in the patent) for use with the scanning system of the present invention to provide a color copy of the original.

These embodiments produce a color copy of the original document locally, as opposed to producing a color copy at a location remote (separate) with the structures described in FIGS. 1 and 1a.

In the embodiments shown in FIGS. 1, 1a, 3 and 3a, laser 10 produces radiation of a wavelength of approximately 4416 angstroms, corresponding to the color blue. The dichroic filter 68 is arranged, in this case, to transmit both green and red light incident thereon (generated by screen portions 28 and 32, respectively) and to absorb the blue color light reflected from screen portions 28 and 32, respectively) and to absorb the blue color light reflected from screen portion 30. As set forth hereinabove, an alternate arrangement replaces the mirrors 90 and 92 and the single dichroic filter 68 with three dichroic mirrors (filters), appropriately selected to transmit green, blue and red light, respectively, the dichroic mirrors being rotated in front of photosensor 70 in a proper sequence to provide the required color filtering.

As indicated hereinabove, in the FIG. 3 embodiment, 52 and 108 and screen 26 are driven intermittently by drive motors 54, 109 and 36, respectively, to allow the scanning of each elemental line on document 50, the driven members remaining stationary for the time required to scan each line of document 50 with light of the three colors. In the embodiment shown in FIG. 3a drums 52 and 108 are rotated continuously whereby the complete document (and the reproduction thereof) is scanned three times. In this case, the complete document is scanned by sequence by each of the colors provided by screen 26, laser beam 12 repeatedly scanning one of the strip portions on screen 26 until the complete document is scanned.

In the preferred scanner embodiment, the strip portion 28 of luminescent screen 26 may comprise a strip, or tape, of naphtalamide dye, typically 12 inches long and 1 inch wide, such as the naphtalamide dye No. 3485, manufactured by the 3M Company, Minneapolis, Minn., which emits a peak radiation of wavelength 5250A (green) when the blue light of laser 10 is incident thereon. Strip portion 32 of screen 26 may comprise a strip, or tape, of red rhodamine dye, typically 12 inches long and 1 inch wide, such as the rhodamine dye No. 3484 also manufactured by the 3M Company, which emits peak radiation of a wavelength of 6160A (red) when the blue light from laser 10 is incident thereon. The strips 28 and 32 are taped, or affixed, to the surface of screen 26. Typical screen materials include metals, such as aluminum, plastic or glass. Although the screen shown in the FIGURES are rectangular in shape, other screen shapes may be utilized. For example, the screen may comprise a cylindrical metal rod which is rotated in an appropriate direction. Screen 26, in the rectangular configuration illustrated, is typically 12 inches long, 5 inches wide and from ⅛ to ⅜ inches thick. In a second scanner embodiment, screen 26 may comprise phosphors deposited on a glass surface, between glass surfaces or in a carrier. The phosphors are chosen such that the phosphor comprising strip portion 28 emits green light when irradiated by the blue light from laser 10 and strip portion 32 emits red light when irradiated by blue light from laser 10. In a third scanner embodiment, laser 10 may comprise a helium-cadmium laser which emits radiation at two wavelengths, 3250A (ultraviolet) and 4416A (blue). In this embodiment, strip portion 28 comprises a rare earth ion, such as terbium, embedded in a glass carrier, the ion emitting green light when irradiated with the ultraviolet emission from laser 10. Strip portion 32 comprises a rare earth ion, such as erbium or prasedemium, embedded in a glass carrier which emits red light in response to the ultraviolet emission from laser 10. Apparatus is provided to cause the ultraviolet emission from laser 10 to scan strip portions 28 and 32, the scanning of strip portion 32 occuring after the blue emission from laser 10 scans strip portion 30, screen 26, drum 42, drum 108, etc. being positioned in a manner as set forth hereinabove with reference to FIGS. 1, 1a, 3 and 3a. In particular, a filter member (not shown) is initially positioned between laser 10 and lens 14, the filter absorbing (or reflecting) blue light and transmitting ultraviolet light. The filter is maintained in this position during the scan of strip portions 28 and 32 and removed from the optical path during the scan of strip portion 30. In the FIG. 1 and 1a embodiment, dichroic filter 68 may be replaced with a filter which inhibits the transmission of ultraviolet light to photosensor 70.

In each of the embodiments described for luminescent screen 26, the decay times (the time required for the emissions from the irradiated material in strip portions 28 and 32 to fall below a specified level) preferably should be as short as possible, i.e., less than 1 microsecond and have high light efficiencies (30 percent or greater).

Figure 4A:
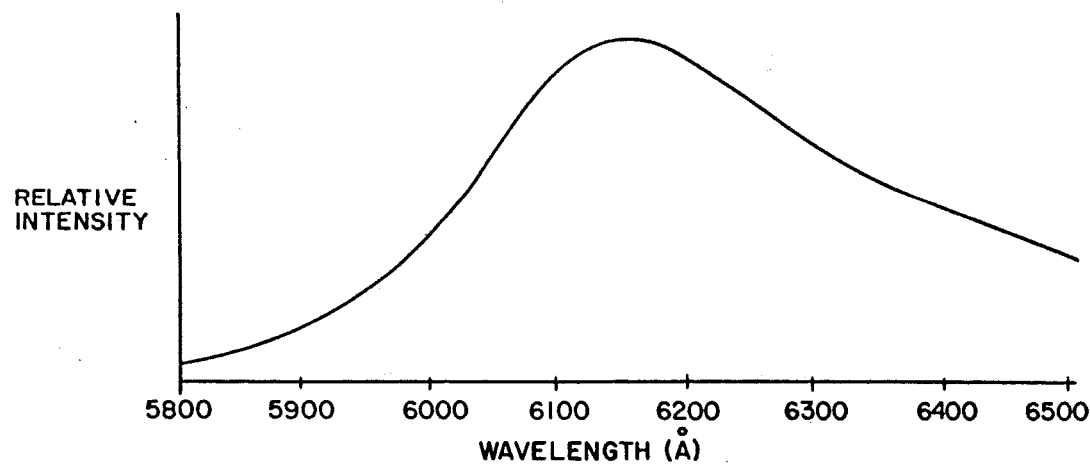
Figure 4B:
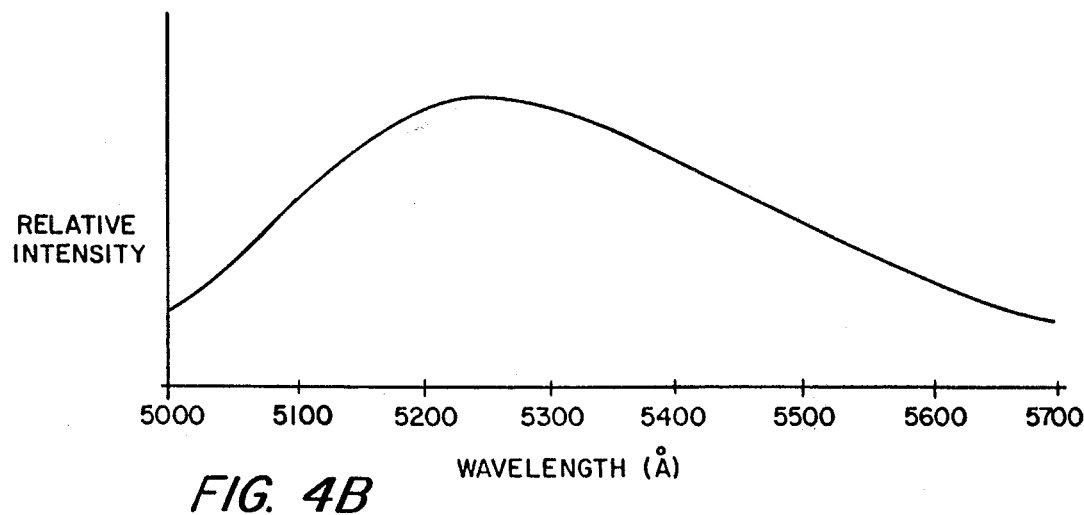

FIGS. 4A and 4B are response curves illustrating the emission spectra of the 3484 and 3485 dyes, respectively. The curves are plotted to show the relative intensity of the induced emission spectra as a function of the incident radiation from laser 10 (4416A).

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or materials to the teachings of the invention without departing from its essential teachings.

What is claimed is:

1. Apparatus for scanning an original document with light of at least two colors, said original document comprising a plurality of elemental lines, comprising:
   laser means for providing a laser beam of a first color,
   means for supporting an original document at a first location,
   means for providing light of at least two colors comprising first means for generating light of a second color when irradiated by said laser beam, and second means for generating light of a third color when irradiated by said laser beam,
   rotatable scanning means positioned to direct said laser beam to said light providing means, said scanning means changing the direction of said laser beam during the rotation thereof in order to move said laser beam along a scan line at said light providing means,
   means for focusing the light generated by scanning said first and second light generating means as a scanning spot on said original document, and
   means for moving said rotatable scanning means and said supporting means in a manner whereby each elemental line on said original document is scanned at least by light of said second and third colors.

2. The apparatus as defined in claim 1 wherein said providing means further includes means for reflecting the incident scanning laser beam to said focusing means, said focusing means focusing said laser beam as a scanning spot on said original document, said moving means enabling said laser beam and the light of said second and third colors to scan each elemental line of said original document.

3. The apparatus as defined in claim 2 wherein said light providing means comprises a supporting member with said first and second light generating means and said reflecting means operatively associated therewith.

4. The apparatus as defined in claim 3 wherein said first light generating means comprises a first dye which emits light of said second color when irradiated by said laser beam and said second light generating means comprises second dye which emits light of said third color when irradiated by said laser beam.

5. The apparatus as defined in claim 4 wherein said first dye comprises red rhodamine dye and said second dye comprises naphtalamide dye.

6. The apparatus as defined in claim 4 wherein said laser means comprises a helium-cadmium laser.

7. The apparatus as defined in claim 2 wherein said original document is in color.

8. The apparatus as defined in claim 7 further including means responsive to light reflected from said original color document during the scanning of each elemental line thereon and generating electrical signals representative of said light reflections, receiver means for producing an output copy, and means for interconnecting said responsive means and said receiver means.

9. The apparatus as defined in claim 8 wherein said receiver means comprises a printer for producing printed copy, printer scanning means operable in timed relation with the cylical operation of said document scanning means, and means for generating signals in said printer scanning means for controlling said printer in accordance with said electrical signals.

10. The apparatus as defined in claim 7 further including a charged photoconductive member and an associated lens element, the light reflections developed during the scanning operations being focused on said photoconductive member to produce a latent electrostatic image corresponding to the information on said original color document, and means for producing a copy of said original color document from said latent electrostatic image.

11. The apparatus as defined in claim 2 wherein said laser beam and the light of said second and third colors scan an elemental line of said original document in sequence and thereafter scan a succeeding elemental line in the same sequence.

12. The apparatus as defined in claim 2 wherein the plurality of elemental lines which comprise said original document are scanned three times by said laser beam, the light of said second color and the light of said third color in a predetermined sequence.

13. Apparatus for scanning an elemental line on original color document with light of three colors comprising:
   laser means for providing a laser beam of a first color,
   means for supporting an original color document at a first location,
   a screen member having first, second and third portions thereon, said first screen portion having a material associated therewith which produces light of a second color when irradiated by said laser beam, said second portion having a material associated therewith which produces light of a third color when irradiated by said laser beam, said third screen portion being reflective of said laser beam,
   rotatable scanning means positioned to direct said laser beam to said screen member, said scanning means changing the direction of said laser beam during the rotation thereof in order to move said laser beam along a scan line at said screen member,
   means for advancing said screen member whereby said first, second and third screen portions are scanned in a predetermined sequence by said laser beam, and
   means for focusing the light from said screen member as a scanning spot on said original color document whereby said original color document is scanned by light of said first, second and third colors along said elemental line.

14. The apparatus as defined in claim 13 further including means for advancing said supporting means after an elemental line is scanned on said original color document by light of said three colors whereby successive elemental lines on said document are positioned for scanning by light of said three colors.

15. The apparatus as defined in claim 14 wherein said first screen portion material comprises a first dye which emits light of said second color when irradiated by said laser beam and said second screen portion comprises a second dye which emits light of said third color when irradiated by said laser beam.

16. The apparatus as defined in claim 15 wherein said first dye comprises red rhodamine dye and said second dye comprises naphtalamide dye.

17. The apparatus as defined in claim 16 further including means responsive to the light reflected from said original color document during the scanning of each elemental line thereon and generating electrical signals representative of said light reflections, receiver means for producing an output copy, and means for interconnecting said responsive means and said receiver means.

18. The apparatus as defined in claim 16 wherein said receiver means comprises a printer for producing printed copy, printer scanning means operable in timed relation with the cylical operation of said document scanning means, and means for generating signals in said printer scanning means for controlling said printer in accordance with said electrical signals.

19. The apparatus as defined in claim 16 further including a charged photoconductive member and an associated lens element, the light reflections developed during the scanning operations being focused on said photoconductive member to produce a latent electrostatic image corresponding to the information on said original color document, and means for producing a copy of said original color document from said latent electrostatic image.

20. Apparatus for scanning an original color document with light on three colors, said document comprising a plurality of elemental lines comprising:
laser means for providing a laser beam of first and second wavelengths, said first wavelength being in the region of the light spectrum corresponding to a first color,
means for supporting an original color document at a first location,
a screen member having first, second and third portions thereon, said first screen portion having a material associated therewith which produces light of a second color when irradiated by the laser beam of said second wavelength, said second portion having a material associated therewith which produces light of a third color when irradiated by the laser beam of said second wavelength, said third screen portion being reflective of the laser beam of said first wavelength,
rotatable scanning means positioned to direct said laser beam to said screen member, said scanning means changing the direction of said laser beam during the rotation thereof in order to move said lser beam along a scan line at said screen member,
means for advancing said screen member whereby said first and second screen portions are scanned in sequence by the laser beam of said second wavelength and said third screen portion is scanned by the laser beam of said first wavelength, and
means for focusing the light from said screen member as a scanning spot on said original color document whereby said original color document is scanned by light of said first, second and third colors.

21. The apparatus as defined in claim 20 further including means for advancing said supporting means after an elemental line is scanned on said original color document by light of said three colors whereby successive elemental lines on said document are positioned for scanning by light of said three colors.

22. The apparatus as defined in claim 20 further including means for continuously advancing said supporting means whereby the plurality of elemental lines comprising said original color documents are scanned three times, in sequence, by light of said first, second and third colors.

23. The apparatus as defined in claim 20 wherein said first screen portion material comprises a first rare earth ion which emits light of said second color when irradiated by the laser beam of said second wavelength and said second screen portion comprises a second rare earth ion which emits light of said third color when irradiated by the laser beam of said second wavelength.

24. The apparatus as defined in claim 23 wherein said first rare earth ion is selected from the class consisting of erbium or prasedemium and said second rare earth ion comprises terbium.

25. Apparatus for scanning an original color document with light of three colors, said document comprising a plurality of elemental lines, comprising:
laser means for providing a laser beam of a first color,
means for supporting an original color document at a first location,
a screen member having first, second and third portions thereon, said first screen portion having a material associated therewith which produces light of a second color when irradiated by said laser beam, said second portion having a material associated therewith which produces light of a third color when irradiated by said laser beam, said third screen portion being reflective of said laser beam,
rotatable scanning means positioned to direct said laser beam to said screen member, said scanning means changing the direction of said laser beam during the rotation thereof in order to move said laser beam along a scan line at said screen member,
means for advancing said screen member whereby said first, second and third screen portions are each scanned a plurality of times in a predetermined sequence by said laser beam,
means for focusing the light from said screen member as a scanning spot on said original color document whereby said original color document is scanned by said first, second and third colors, and
means for continuously advancing said supporting means whereby the plurality of elemental lines comprising said original color document are scanned three times, in sequence, by light of said first, second and third colors, the number of scans of each screen portion being at last equal to the numer of elemental lines in said color document.

26. The apparatus as defined in claim 25 wherein said first screen portion material comprises a first dye which emits light of said second color when irradiated by said laser beam and said second screen portion comprises a second dye which emits light of said third color when irradiated by said laser beam.

27. The apparatus as defined in claim 26 wherein said first dye comprises red rhodamine dye and said second dye comprises naphtalamide dye.

28. The apparatus as defined in claim 27 further including means responsive to the light reflected from said original color document during the scanning of each elemental line thereon and generating electrical signals representative of said light reflections, receiver means for producing an output copy, and means for interconnecting said responsive means and said receiver means.

29. The apparatus as defined in claim 27 wherein said receiver means comprises a printer for producing printed copy, printer scanning means operable in timed relation with the cylical operation of said document scanning means, and means for generating signals in said printer scanning means for controlling said printer in accordance with said electrical signals.

30. The apparatus as defined in claim 27 further including a charged photoconductive member and an associated lens element, the light reflections developed during the scanning operations being focused on said photoconductive member to produce a latent electrostatic image corresponding to the information on said original color document, and means for producing a copy of said original color document from said latent electrostatic image.

31. A method for scanning an elemental line on an original color document with light of three colors comprising the steps of:
providing a laser beam of a first color,
supporting an original color document at a first location,
providing a screen member having first, second and third portions thereon, said first screen portion having a material associated therewith which produces light of a second color when irradiated by said laser beam, said second portion having a material associated therewith which produces light of a third color when irradiated by said laser beam, said third screen portion being reflective of said laser beam,
directing said laser beam to said screen member,
changing the direction of said laser beam in order to move said laser beam along a scan line at said screen member,
advancing said screen member whereby said first, second and third screen portions are scanned in a predetermined sequence by said laser beam, and
focusing the light from said screen member as a scanning spot on said original color document whereby said original color document is scanned along said elemental line by laser light of said three colors.

32. The method as defined in claim 31 further including the step of advancing the original color document after an elemental line is scanned on said original color document by light of said three colors whereby successive elemental lines on said document are positioned for scanning by light of said three colors.

33. The method as defined in claim 32 wherein said first screen portion material comprises a first dye which emits light of said second color when irradiated by said laser beam and said second screen portion comprises a second dye which emits light of said third color when irradiated by said laser beam.

34. The method as defined in claim 33 wherein said first dye comprises red rhodamine dye and said second dye comprises naphtalamide dye.

35. The method as defined in claim 34 further including the steps of generating electrical signals representative of the light reflected from said original color document during the scanning of each elemental line thereon and producing an output copy of said original color document at a location remote from said first location.

36. The method as defined in claim 34 further including the step of providing a charged photoconductive member and an associated lens element, the light reflections developed during the scanning operations being focused on said photoconductive member to produce a latent electrostatic image corresponding to the information on said original color document and producing a copy of said original color document from said latent electrostatic image.

37. A method for scanning an original color document with light of three colors, said document comprising a plurality of elemental lines, comprising the steps of:
providing a laser beam of a first color, supporting an original color document at a first location,
providing a screen member having first, second and third portions thereon, said first screen portion having a material associated therewith which produces light of a second color when irradiated by said laser beam, said second portion having a material associated therewith which produces light of a third color when irradiated by said laser beam, said third screen portion being reflective of said laser beam,
directing said laser beam to said screen member,
changing the direction of said laser beam in order to move said laser beam along a scan line at said screen member,
advancing said screen member whereby said first, second and third screen portions are scanned in a predetermined sequence by said laser beam, and
focusing the light from said screen member as a scanning spot on said original color document whereby said original color document is scanned by light of said first, second and third colors.

38. The method as defined in claim 37 further including the step of continuously advancing the original color document whereby the plurality of elemental lines comprising the original color document are completely scanned three times by light of said first, second and third colors.

39. The method as defined in claim 38 wherein said first screen portion material comprises a first dye which emits light of said second color when irradiated by said laser beam and said second screen portion comprises a second dye which emits light of said third color when irradiated by said laser beam.

40. The method as defined in claim 39 wherein said first dye comprises red rhodamine dye and said second dye comprises naphtalamide dye.

41. The method as defined in claim 40 further including the steps of generating electrical signals representative of the light reflected from said original color document during the scanning of each elemental line thereon and producing an output copy of said original color document at a location remote from said first location.

42. The method as defined in claim 40 further including the step of providing a charged photoconductive member and an associated lens element, the light reflections developed during the scanning operations being focused on said photoconductive member to produce a latent electrostatic image corresponding to the information on said original color document and producing a copy of said original color document from said latent electrostatic image.

* * * * *

UNITED STATES PATENT AND TRADEMARK OFFICE
CERTIFICATE OF CORRECTION

PATENT NO. : 4,012,776
DATED : 3/15/77
INVENTOR(S) : Peter Mrdjen

It is certified that error appears in the above-identified patent and that said Letters Patent are hereby corrected as shown below:

Column 11, line 41, delete "on" and insert --of--.

Column 11, line 63, delete "lser" and insert --laser--.

Signed and Sealed this

Thirty-first Day of October 1978

[SEAL]

Attest:

RUTH C. MASON
Attesting Officer

DONALD W. BANNER
Commissioner of Patents and Trademarks